United States Patent [19]

Sugimura

[11] Patent Number: 4,838,316

[45] Date of Patent: Jun. 13, 1989

[54] ACCUMULATOR PROVIDED WITH AN INSERT

[76] Inventor: Nobuyuki Sugimura, 308, Mabase, Shimizu-shi, Shizuoka-ken, Japan

[21] Appl. No.: 174,362

[22] Filed: Mar. 28, 1988

[30] Foreign Application Priority Data

Apr. 7, 1987 [JP] Japan .......................... 62-052552[U]

[51] Int. Cl.[4] .............................................. F16L 55/04

[52] U.S. Cl. ......................................... 138/30; 138/42

[58] Field of Search ............................ 138/30, 26, 42; 220/85 B

[56] References Cited

U.S. PATENT DOCUMENTS 2,904,077 9/1959 Trumper .............................. 138/30
3,195,577 7/1965 Greer .................................... 138/30
3,279,499 10/1966 Mercier ................................ 138/30
3,424,201 1/1969 Sugimura et al. ...................... 138/30
3,961,646 6/1976 Schon .................................... 138/30
4,638,838 1/1987 Richard et al. ....................... 138/30

FOREIGN PATENT DOCUMENTS 6701749 8/1968 Netherlands .......................... 138/30

*Primary Examiner*—James E. Bryant, III

[57] ABSTRACT

An accumulator provided with an insert, in which a vessel main body having a feed/discharge port or ports is partitioned into a gas chamber and a liquid chamber by means of a bladder, and an insert projecting into the bladder is disposed, whereby a volume of the gas chamber is reduced.

8 Claims, 3 Drawing Sheets

ACCUMULATOR PROVIDED WITH AN INSERT

BACKGROUND OF THE INVENTION

The present invention relates to an accumulator provided with an insert that can be equipped in a hydraulic circuit or the like, and more particularly to an accumulator provided with an insert to be used for absorbing pressure pulsation of a pump.

Heretofore, a bladder type accumulator has been used as an accumulator for absorbing pressure pulsation of a pump, and in such an accumulator an interior of a vessel main body provided with a feed/discharge port or port is partitioned into a gas chamber and a liquid chamber by means of a bladder formed of an elastic member, gas held at a predetermined pressure is filled in the gas chamber, while the liquid chamber is communicated with a hydraulic circuit, and liquid is made to flow into and out of the liquid chamber through communication holes in a liquid chamber wall.

In the case of a bladder type accumulator in the prior art, if it is used for an oil hydraulic pump accompanied by pressure pulsation of several handred cycles such as, for instance, a gear pump, a vane pump or the like, it cannot sufficient absorb the pressure pulsation.

That is, a bladder type accumulator in the prior art could not absorb pump pressure pulsation at a high frequency, and the reason is as follows.

In FIG. 4, reference character A designates a piping circuit connecting a pump B and a tank C, reference character D designates a neck of an accumulator ACC connected in the piping circuit A, reference character E designates a bladder which partitions a gas chamber F and a liquid chamber G from each other, and reference character H designates a choke formed in the piping circuit A.

In order to absorb pump pressure pulsation at a high frequency by means of the accumulator ACC, two conditions are considered to be necessary, that is, condition—(a) that a natural frequency of the accumulator system should be made to be close to a pulsating frequency of the pump, and condition-(b) that a frequency range of attenuation for pressure pulsation should be chosen to be broad so as to attenuate two or three pressure pulsation frequency components, are considered to be necessary.

In connection to condition—(b) above, a mass M which governs a natural frequency of an accumulator is represented, as is well known, approximately by the following formula, as viewed from the neck D:

$$M=\rho SL,$$

where $\rho$ represents a density of liquid, S represents a cross-section area of a neck, that is, a cross-section of an access port for a liquid chamber, and L represents an effective length of the neck, that is, a length passed by the liquid after it has entered the liquid chamber before it collides with the bladder.

A spring constant $\overline{K}$ of the filled gas in the accumulator ACC as viewed from the neck D is represented, as is well known, by the folowing formula:

$$\overline{K}=\frac{r\cdot P\cdot S^2}{V}$$

where r represents a polytropic number of the filled gas, P represents an inherent average pressure and V represents a volume of the gas at the pressure P. If a natural frequency fn of the accumulator is calculated on the basis of the above formulae, it is represented by the folowing formula:

$$fn=\frac{1}{2\pi}\sqrt{\frac{r\cdot P\cdot S}{\rho\cdot L\cdot V}}$$

From this formula it is seen that in order to increase the natural frequency fn of the accumulator, in the event that P and $\rho$ are respectively held constant, it is only necessary to increase the neck cross-section area S, to decrease the neck effective length L and to decrease the volume V of the gas at the pressure P.

Hence, it will be conceived to decrease the volume V of the gas by reducing a diameter of the bladder, but if the diameter is reduced, a surface area of the bladder become small and this is disadvantageous for effectively absorbing pressure pulsation.

SUMMARY OF THE INVENTION:

It is therefore one object of the present invention to provide an improved bladder type accumulator which has a raised natural frequency and can effectively attenuate pressure pulsation at a high frequency of a hydraulic pump.

Another object of the present invention is to provide an improved bladder type accumulator in which a contracted configuration of a bladder is effectively constrained and thereby the bladder is prevented from being damaged as a result of repeated contraction into an unfavorable configuration.

According to one feature of the present invention, there is provided a bladder type accumulator comprising a vessel main body having a feed/discharge port or ports, a bladder for partitioning the interior of the vessel main body into a gas chamber and a liquid chamber, and an insert disposed so as to be projected into the bladder, whereby a bladder having a large surface area and a small volume can be formed.

DESCRIPTION OF THE PREFERRED EMBODIMENTS

Figure 1:
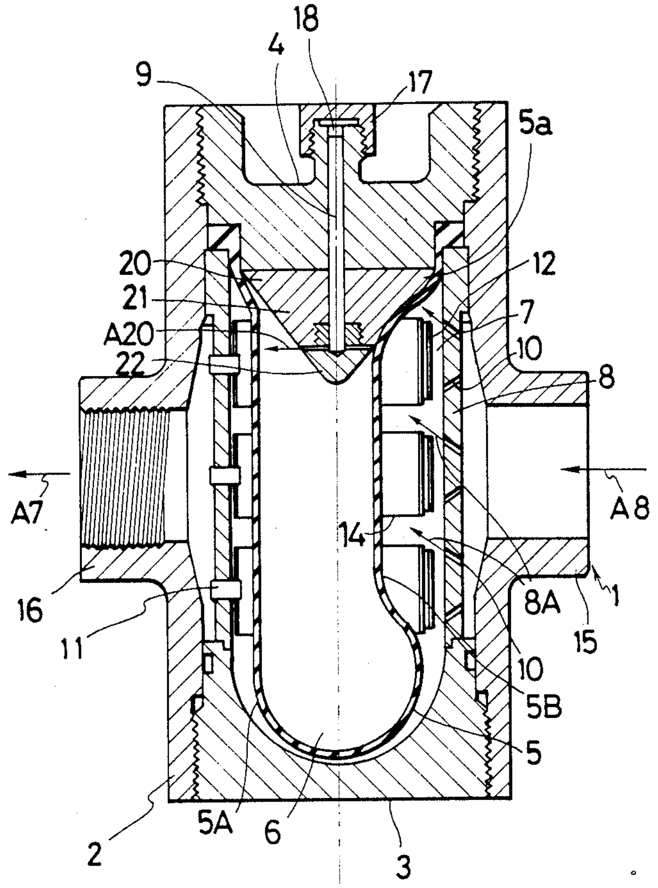
FIG. 1 is a longitudinal cross-section view showing one preferred embodiment of the pesent invention.

In FIG. 1, reference numeral 1 designates a vessel main body consisting of an outer tube 2 of cylindrical shape having a side plate 3 disposed at one end thereof and a lid 4 disposed at the other end thereof, and the interior of the vessel main body 1 is partitioned into a gas chamber 6 and a liquid chamber 7 by means of a bladder 5 formed of an elastic member. An opening 5a of this bladder is sealingly closed by the lid 4. Reference numeral 8 designates an inner tube that is coaxial with the outer tube 2 and the bladder 5, and in this inner tube 8 are formed a plurality of communication holes 10 for allowing liquid to flow into and out of the liquid chamber 7. Reference numeral 12 designates valve bodies fixedly secured to the inside of the inner tube 8 via pins 11. When the pressure of the liquid has become lower than the pressure in the gas chamber 6, this valve body 12 is pushed outwards by the bladder 5 and comes into contact with the inner surface of the inner tube 8, thereby the communication holes 10 are losed, and the bladder 5 is prevented from entering the communiation holes 10. Reference numeral 20 designates an insert for reducing a volume of gas in the gas chamber 6, which is formed in a conical shape and is fixedly secured to the lid 4 by any fixing means not shown.

Figure 4:
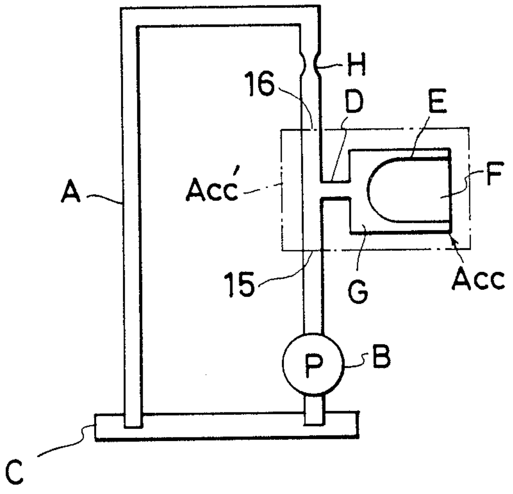
FIG. 4 PRIOR ART
FIG. 4 is a schematic view showing general arrangement of a bladder type accumulator in a hydraulic circuit.

Here it is to be noted that although the accumulator ACC schematically shown in FIG. 4 may seam somewhat different from the accumulator illustrated in detail in FIG. 1 with respect to its connection to a hydraulic circuit, they are quite equivalent to each other. More particularly, in FIG. 4 the accumulator ACC is connected to a hydraulic circuit via a single port named "neck D", while the accumulator shown in FIG. 1 is adapted to be connected to a liquid feed source (i.e. a hydraulic pump) via a feed port 15 and to a hydraulic load (i.e. a utilization apparatus of a hydraulic pressure) via a discharge port 16. However, attention should be paid to the fact that in the accumulator the feed port 15 and the discharge port 16 are jointed via the liquid chamber 7 surrounding the bladder 5. Therefore, if one consider that the point numbered 15 in FIG. 4 is a feed port, the point numbered 16 in FIG. 4 is a discharge port, and the piping section between the point 15 and 16 and the branched neck D jointly form a part of the liquid chamber G, it will be readily seen that the portion enclosed by a dash-dot line frame Acc' in FIG. 4 is exactly equivalent to the accumulator illustrated in FIG. 1. On the other hand, if only the portion designated by reference numeral Acc is conidered to be an accumulator, then the branched piping section named "neck D" in FIG. 4 is only one access port to that accumulator, and it serves as a combined feed and discharge port because the liquid in the hydraulic circuit would flow into and out of the accumulator Acc through this single access port when the pressure in the hydraulic circuit is increased or decreased as a result of pressure pulsation caused by the hydraulic pump.

Therefore, the term "a feed/discharge port or ports" used throughout this specification and claims should be interpreted to mean both the single access port to the accumulator Acc serving as a combined feed and discharge port as illustrated in FIG. 4 and the two access ports to the accumulator Acc' serving as a feed port and a discharge port, respectively, as shown in FIG. 1.

Now description will be made on an operation of the bladder type accumulator according to the abovedescribed embodiment of the invention. After a feed port 15 and a discharge port 16 have been connected to a hydraulic circuit not shown, a cap 17 is removed and gas is fed to the accumulator through a gas feed port 18 by making use of gas filling means not shown. Then, the gas passes through a gas passageway 9, further flows in the direction of arrow A20 through a gap space between a base portion 21 and a top portion 22 of an insert 20, and enters the gas chamber 6. This gas space is formed in such dimensions that the bladder may not squeeze into the gap space even if the gas in the bladder should leaks out and the bladder should be pushed against this gap space by the liquid pressure.

When the pressure in the gas chamber 6 has reached a predetermined pressure, the feed of gas is stopped and the cap 17 is fitted to the gas feed port 18. At this time, the bladder 5 expands and comes into contact with the inner surface of the inner tube 8 via the valve bodies 12, and when the pressure in the hydraulic circuit becomes a predetermined pressure, the bladder 5 takes the state shown at 5A in FIG. 1.

If the hydraulic pressure in the hydraulic circuit decreases, then the bladder 5 expands, hence the liquid within the liquid chamber is pushed and discharged through the communication holes 10 to the hydraulic circuit, and it flows in the direction of an arrow A7.

At this time, the bladder 5 moves in the radial directions towards the inner tube 8, in the midway it comes into contact with a protector 14 of the valve body 12, and if the bladder 5 further moves in the same directions, the valve body 12 comes into contact with the inner surface of the inner tube 8. However, since the communication holes 10 are closed by the valve body 12, the bladder 5 would neven enter these communication holes 10.

If the hydraulic pressure in the hydraulic circuit increases, then liquid would flow into the liquid chamber 7 through the communication holes 10 at a high speed in the direction of arrows A8, would separate the valve body 12 and the bladder 5 from the inner tube 8 and would move these members 5 and 12 in the opposite directions to those described above.

At this moment, the bladder 5 deforms regularly as guided by the insert 20 and takes the state shown at 5B in FIG. 1, thus an increment of the pulating pressure is reduced by volume change of the bladder 5, that is, by a dynamic resilient effect of the bladder 5, and thereby the pressure pulsation can be absorbed.

Figure 2:
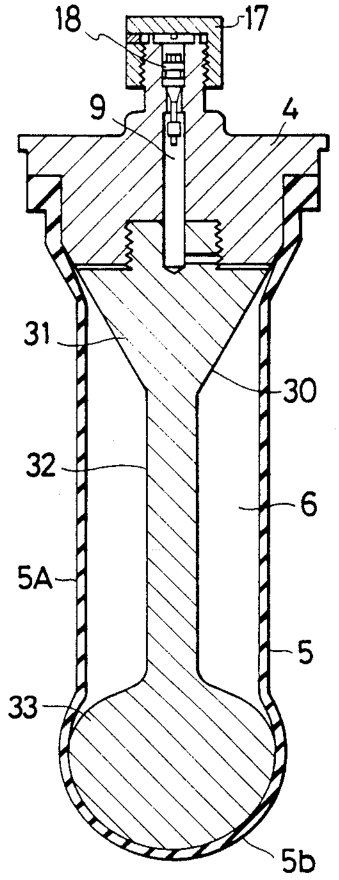
FIG. 2 is a longitudinal cross-section view showing an essential portion of another preferred embodiment of the present invention.
Figure 3:
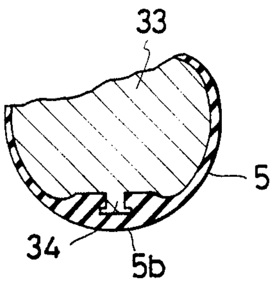
FIG. 3 is a partial longitudinal cross-section view showing only a part of an essential portion of still another preferred embodiment of the present invention.

The present invention should not be limited to the above-described embodiment, but for instance, the configuration of the insert could be modified as shown in FIG. 2 or 3.

An insert 30 illustrated is FIG. 2 is composed of a base portion 31, a middle portion 32 and a top portion 33, the base portion 31 is formed in a frusto-conical shape, the middle portion 32 is formed in a circular column shape, the top portion 33 is formed in a spherical shape, and the top portion 33 is held in contact with the bottom **5*b* of the bladder 5**.

Furthermore, modification could be made such that a locking portion 34 is provided at the tip end of the top portion 33 as shown in FIG. 3, the bottom **5*b* of the bladder 5 is engaged with the locking portion 34 and the both members 5 and 33 are thereby fixedly secured to each other. If such provision is made, it is possible to constrain a contracted configuration of the bladder 5 and thereby prevent the bladder 5** from being damaged by repeated contraction into an unfavorable configuration.

While the lid 4 and the insert 20 or 30 were formed separately in the above-described embodiment, it is a matter of course that the effect of the insert can be attained also by forming the inside of the lid 4 in a conical shape.

What is claimed is:

1. An accumulator provided with an insert, comprising a vessel main body having a feed/discharge port or ports, a bladder for partitioning the interior of said vessel main body into a gas chamber and a liquid chamber, an inner tube provided between said feed/discharge port or ports and said bladder, said inner tube including a plurality of communication holes inclined with respect to an axis of said vessel main body so that streams of liquid passing through said communication holes may collide obliquely, and an insert disposed so as to project into the bladder for the purpose of reducing a volume of the gas chamber.

2. An accumulator provided with an insert as claimed in claim 1 further including a lid which sealingly closes an opening of the bladder, characterized in that the insert forms a part of said lid.

3. An accumulator provided with an insert as claimed in claim 1 further including a lid which sealingly closes an opening of the bladder, characterized in that the insert is disposed on the inside of said lid.

4. An accumulator provided with an insert as claimed in claim 1, characterized in that the insert is of conical shape.

5. An accumulator provided with an insert as claimed in claim 1, characterized in that the insert is formed of a base portion, a middle portion and a top portion.

6. An accumulator provided with an insert as claimed in claim 5, characterized in that the insert includes a bottom portion of conical shape.

7. An accumulator provided with an insert as claimed in claim 5, characterized in that the top portion is of the shape corresponding to a deformed configuration of the bladder.

8. An accumulator provided with an insert as claimed in claim 5, characterized in that the top portion is of spherical shape.

* * * * *